(12) United States Patent  
Oh

(10) Patent No.: US 7,298,424 B2
(45) Date of Patent: Nov. 20, 2007

(54) DISPLAY APPARATUS AND METHOD OF CONTROLLING THE SAME

(75) Inventor: In-heung Oh, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 431 days.

(21) Appl. No.: 10/140,991

(22) Filed: May 9, 2002

(65) Prior Publication Data

US 2002/0167610 A1 Nov. 14, 2002

(30) Foreign Application Priority Data

May 9, 2001 (KR) ............... 2001-25280

(51) Int. Cl.
*H04N 5/44* (2006.01)

(52) U.S. Cl. .............. 348/706; 348/555; 348/569

(58) Field of Classification Search ........ 348/570, 348/560, 564, 554, 555, 705, 706; H04N 5/44
See application file for complete search history.

(56) References Cited

U.S. PATENT DOCUMENTS

| | | | |
|---|---|---|---|
| 5,416,535 A * | 5/1995 | Sato et al. ............. | 348/706 |
| 5,486,877 A * | 1/1996 | Tanaka ............... | 348/722 |
| 5,563,665 A | 10/1996 | Chang | |
| 5,691,778 A * | 11/1997 | Song ............... | 725/59 |
| 5,929,931 A * | 7/1999 | Hoekstra ............ | 725/136 |
| 6,028,643 A | 2/2000 | Jordan et al. | |
| 6,072,541 A * | 6/2000 | Song ............... | 348/706 |
| 6,678,005 B2 * | 1/2004 | Anderson et al. ........ | 348/553 |
| 6,753,928 B1 * | 6/2004 | Gospel et al. ........ | 348/569 |

FOREIGN PATENT DOCUMENTS

| | | |
|---|---|---|
| DE | 195 20 281 | 12/1996 |
| DE | 196 04 647 | 3/1997 |
| EP | 0746165 | 12/1996 |
| JP | 6-149413 | 5/1994 |
| JP | 6-165086 | 6/1994 |
| JP | 7-264521 | 10/1995 |
| JP | 8-5986 | 1/1996 |
| JP | 8-98096 | 4/1996 |
| JP | 9-261563 | 10/1997 |
| KR | 1997-66842 | 10/1997 |
| KR | 1998-39699 | 8/1998 |
| KR | 1998-61527 | 10/1998 |
| KR | 1999-34179 | 5/1999 |

OTHER PUBLICATIONS

Recently Issued Office Action in related German Patent Office Application

* cited by examiner

*Primary Examiner*—Michael H. Lee
(74) *Attorney, Agent, or Firm*—Staas & Halsey LLP

(57) ABSTRACT

A display apparatus includes a signal source connecting port through which a video signal source is connected. The display apparatus includes a TV tuner connecting port to connect to a TV tuner. A selection part selects one of a video signal, transmitted from the signal source connecting port, and a TV signal, transmitted from the TV tuner connecting port to be displayed, to control the TV tuner. A micro controller displays the one of the video signal and the TV signal according to the selection from the selection part, displays a TV tuner control OSD when the TV signal is selected, and transmits a control signal from the selection part to the TV tuner through the TV tuner connecting port based on the TV tuner control OSD.

33 Claims, 6 Drawing Sheets

DISPLAY APPARATUS AND METHOD OF CONTROLLING THE SAME

CROSS-REFERENCE TO RELATED APPLICATIONS

This application claims the benefit of Korean Application No. 2001-25280, filed May 9, 2001, in the Korean Patent Office, the disclosure of which is incorporated herein by reference.

BACKGROUND OF THE INVENTION

1. Field of the Invention

The present invention relates in general to a display apparatus, and more particularly, to a display apparatus having a connecting port for an external TV tuner.

2. Description of the Related Art

Generally, a display apparatus displays a video signal received from signal sources, such as a video card and a TV card of a computer. Recently, a display apparatus has been developed with improved utility, which can display a video signal received from various external signal sources, such as a videotape recorder (VTR) and a camcorder, and the display apparatus is out on the market. Further, a display apparatus has been developed which has an internal TV tuner and displays a TV signal processed by itself, and the display apparatus is out on the market.

However, in the display apparatus including the TV tuner, a user cannot separate a TV function from a monitor function. That is, the display apparatus having the TV tuner may only be employed for both the TV and monitor functions.

SUMMARY OF THE INVENTION

Accordingly, the present invention has been made keeping in mind the above-described shortcomings and user's need, and an object of the present invention is to provide a display apparatus to which a TV tuner is selectively added at a user's option, and a method of controlling the TV tuner through an OSD (on screen display).

To achieve the above and other objects, the present invention may be accomplished by providing a display apparatus having a signal source connecting port through which a video signal source is connected, the display apparatus including: a TV tuner connecting port to connect to a TV tuner; a selection part to select one of a video signal, transmitted from the signal source connecting port, and a TV signal, transmitted from the TV tuner connecting port to be displayed, to control the TV tuner; and a micro controller displaying the one of the video signal and the TV signal according to the selection from the selection part, displaying a TV tuner control OSD when the TV signal is selected, and transmitting a control signal from the selection part to the TV tuner through the TV tuner connecting port based on the TV tuner control OSD.

The micro controller displays a signal selection OSD to select the one of the video signal and the TV signal to be displayed when the selection part is activated and the TV tuner is connected to the display apparatus.

The display apparatus further includes an OSD control button to display the TV tuner control OSD and to control the TV tuner based on the TV tuner control OSD. The micro controller displays the TV tuner control OSD when the OSD control button is pushed and the TV tuner is connected to the display apparatus. The TV tuner control OSD includes channel icons to select a channel of the TV tuner. The display apparatus further includes a selection button, and a touch screen, wherein the TV tuner control OSD is selected by at least one of the selection button and the touch screen.

The display apparatus further includes a TV tuner sensor detecting whether the TV tuner is connected to the display apparatus through the TV tuner connecting port. When the TV tuner sensor does not detect the TV tuner, the micro controller displays an OSD indicating that the TV tuner is not connected to the display apparatus.

The TV tuner sensor includes a transistor, wherein when the TV tuner is connected to the display apparatus, the transistor is turned on, outputting a first signal of a first state, and when the TV tuner is disconnected from the display apparatus, the transistor is turned off, outputting a second signal of a second state opposite to the first state, and a resistor connected to the transistor To achieve the above and other objects, the present invention provides a method of controlling a display apparatus including signal source connecting ports and a TV tuner connecting port to connect to a TV tuner, the method including: detecting whether the TV tuner is connected to the display apparatus; displaying a signal selection OSD when the TV tuner is detected; selecting a TV signal through the signal selection OSD; displaying a TV tuner control OSD when the TV signal is selected; and transmitting a control signal to the TV tuner through the TV tuner connecting port in response to the selection of the TV signal.

The signal selection OSD includes icons to select a video signal outputted from the TV tuner to be displayed on a video card of a computer and/or a VTR. The TV tuner control OSD includes channel icons to select a channel of the TV tuner. The method further includes displaying an OSD indicating that the TV tuner is not connected to the display apparatus when the TV tuner is not detected.

To achieve the above and other objects, the present invention provides a display apparatus including a signal source connecting port through which a video signal source is connected, including: a TV tuner connecting port to connect to a TV tuner; a selection part selecting a video signal from the video signal source or a TV signal from the TV tuner connecting port to control the TV tuner; and a micro controller displaying the video signal or the TV signal according to the selection from the selection part, displaying a TV tuner control OSD when the TV signal is selected, and transmitting an OSD control signal selected based on the TV tuner control OSD to the TV tuner.

To achieve the above and other objects, the present invention provides a display apparatus connectable to a VTR, a TV tuner, and a computer and including a signal source connecting port through which a video signal source is connected, the display apparatus including: a TV tuner sensor detecting whether the TV tuner is connected to the display apparatus; a video decoder converting a video signal transmitted from the VTR or the TV tuner into a digital video signal; a video signal processing part processing a video signal from the computer and/or the digital video signal from the video decoder; a selection part selecting the video signal from the computer and/or the digital video signal from the VTR or the TV tuner to be displayed and outputting a selected video signal indicative thereof; a display part; and a micro controller controlling the video decoder and the video signal processing part so as to display the selected video signal from the selection part in the display part.

To achieve the above and other objects, the present invention provides a method of controlling a display apparatus including signal source connecting ports and a TV tuner connecting port to connect to a TV tuner, the method including: detecting whether the TV tuner is connected to the display apparatus to prevent a signal selection OSD from being displayed when the TV tuner is not connected to the display apparatus; displaying the signal selection OSD when the TV tuner is detected; selecting a TV signal through the signal selection OSD; displaying a TV tuner control OSD when the TV signal is selected; and transmitting a control signal to the TV tuner through the TV tuner connecting port in response to the selection of the TV signal, allowing a user to selectively add a TV function through the connecting port for the TV tuner.

These together with other objects and advantages, which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The present invention will be better understood and its various objects and advantages will be more fully appreciated from the following description taken in conjunction with the accompanying drawings, in which.

DETAILED DESCRIPTION OF THE PREFERRED EMBODIMENTS

The present invention will be described in more detail with reference to the accompanying drawings.

Figure 1:
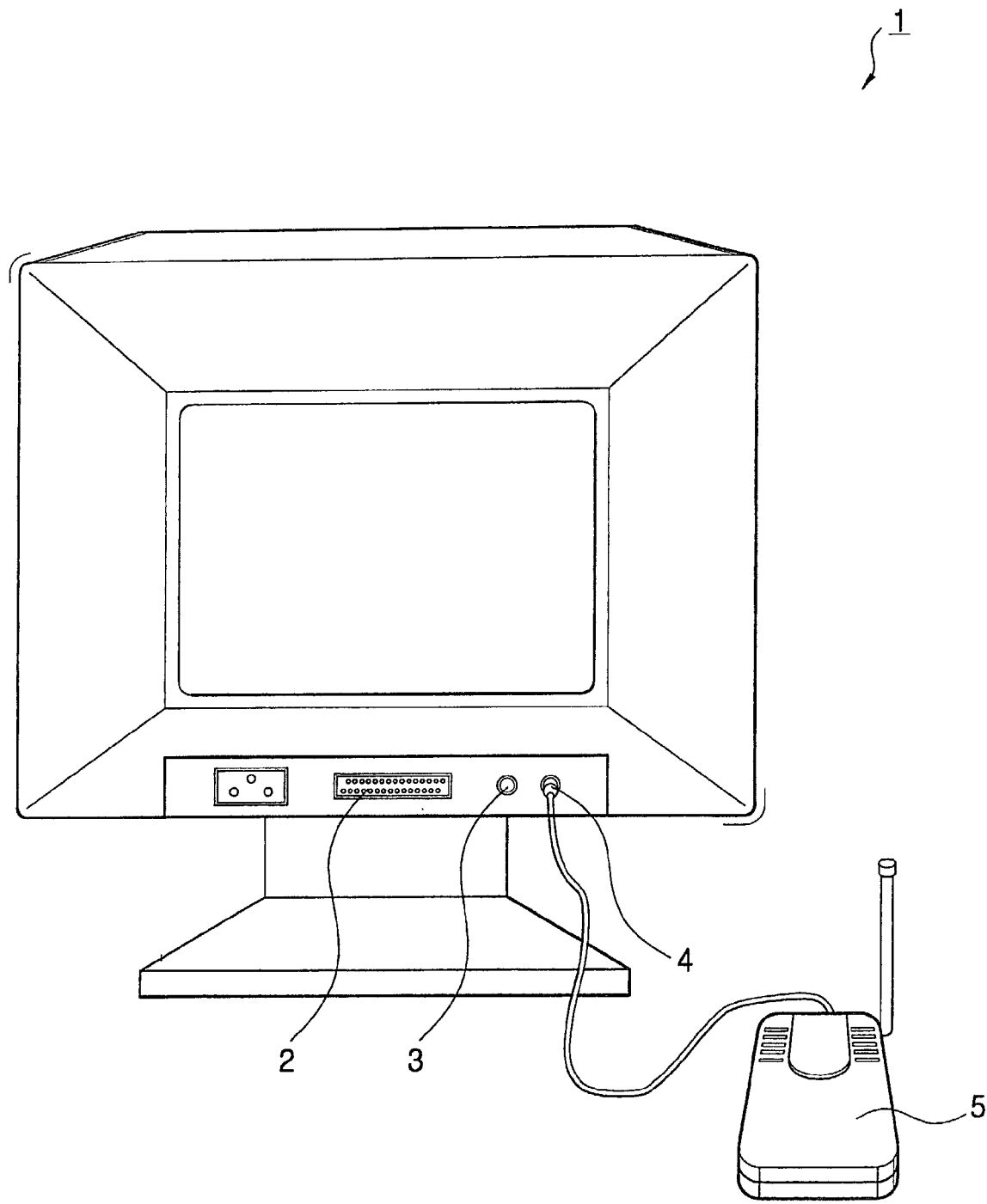
FIG. 1 is a rear view of a display apparatus according to an embodiment of the present invention.
Figure 2:
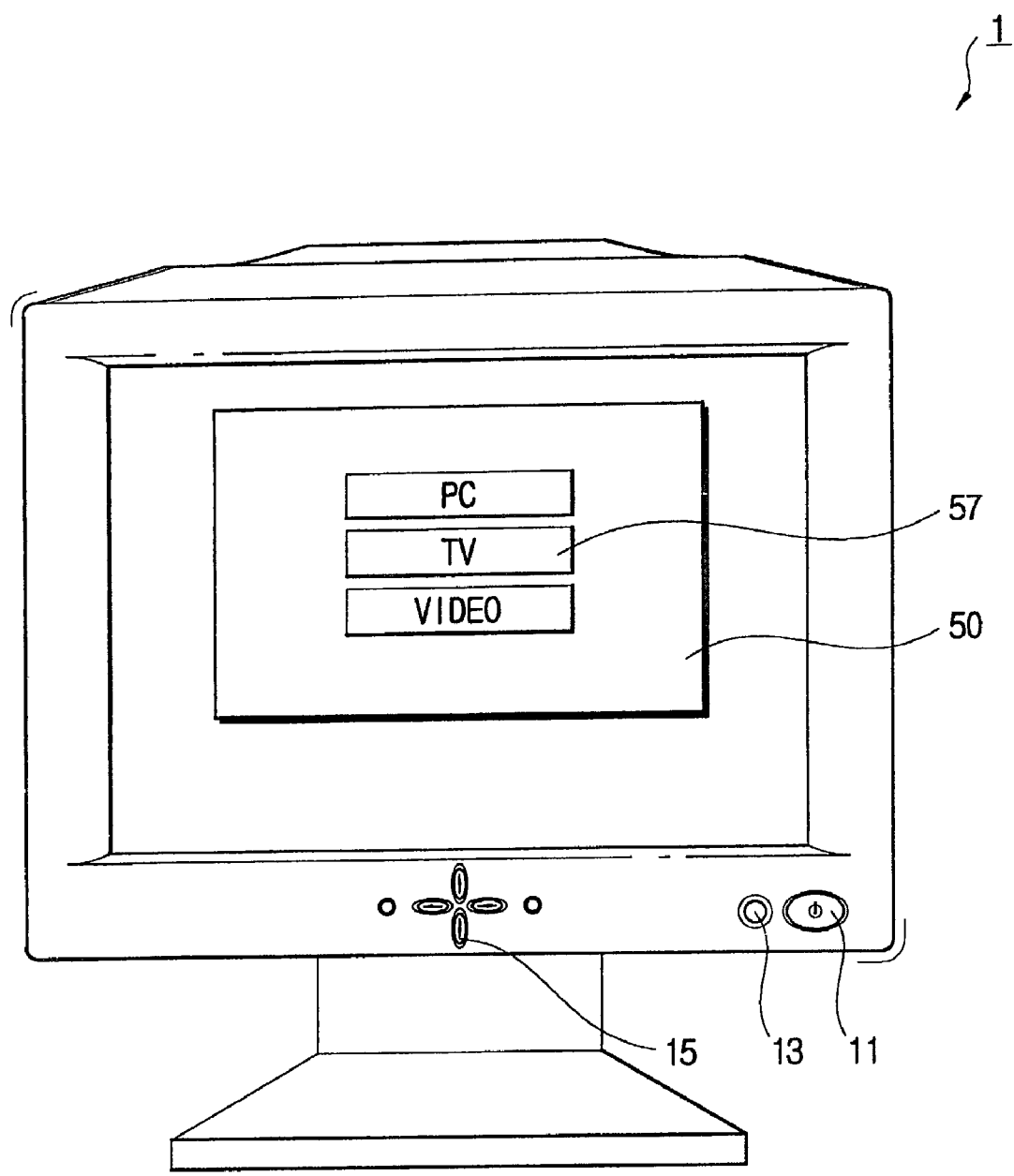
FIG. 2 is a front view of the display apparatus of FIG. 1.
Figure 3:
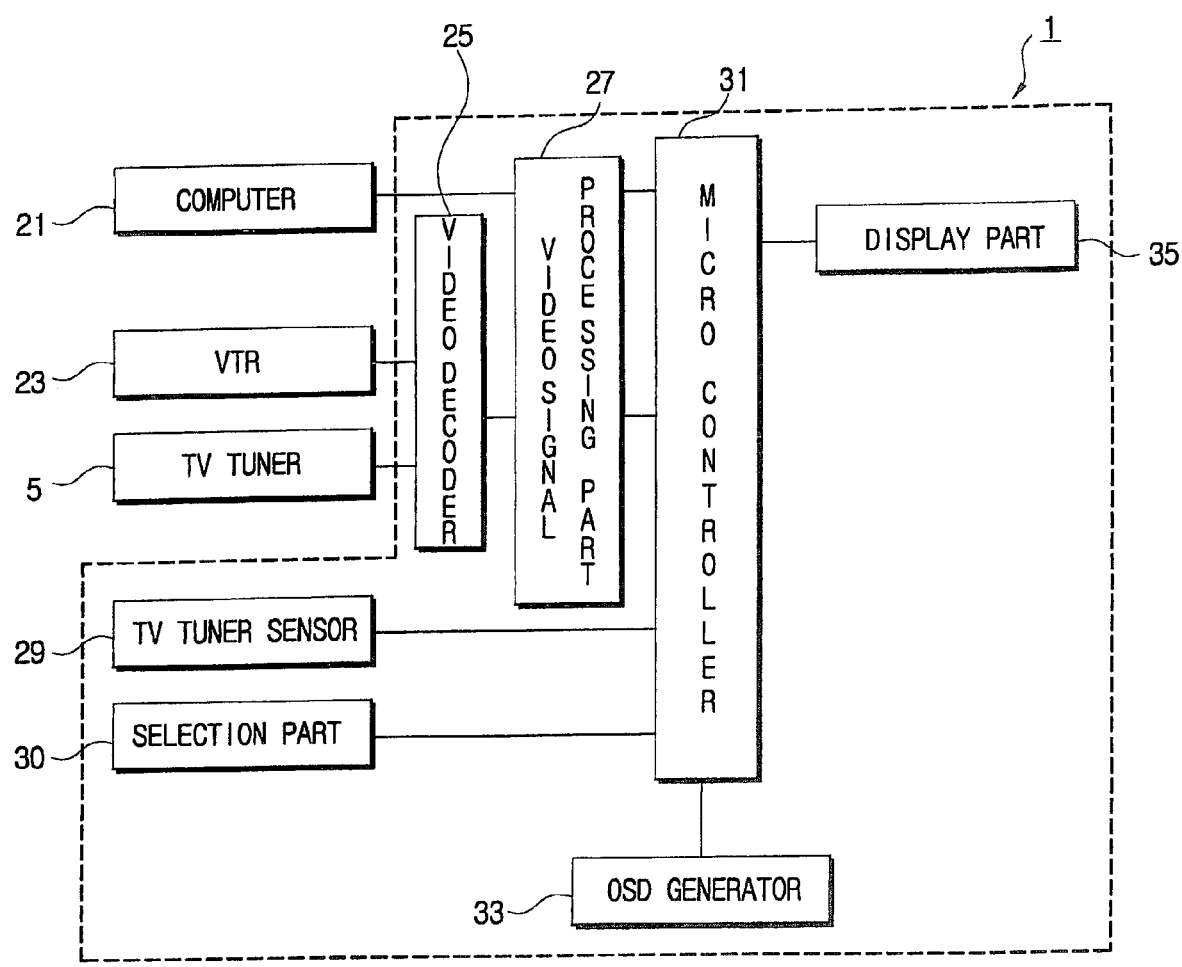
FIG. 3 is a control block diagram of the display apparatus of FIG. 1.

FIGS. 1 and 2 are rear and front views of a display apparatus 1 according to an embodiment of the present invention, respectively. FIG. 3 is a control block diagram of the display apparatus of FIG. 1. As shown in FIG. 1, on the rear of the display apparatus 1 is provided connecting ports 2 and 3 connected to a computer 21 including a video card and a videotape recorder (VTR) 23, respectively, and a TV tuner connecting port 4 connected to an external TV tuner 5. As shown in FIG. 2, on a front lower part of the display apparatus 1 a power button 11, a signal selection button 13 to select which video signal outputted from the computer 21, the VTR 23, and/or the TV tuner 5 will be displayed, and an OSD (on screen display) control button 15 are provided.

When the signal selection button 13 is pushed, a signal selection OSD 50 is displayed to determine which one of the video signals outputted from the computer 21, the VTR 23, and/or the TV tuner 5 will be displayed. The signal selection OSD 50 contains a plurality of icons, and, in an exemplary embodiment, the icons are alternately activated each time the signal selection button 13 is pushed, thereby allowing a user to select one of the icons corresponding to the computer 21, the VTR 23, and/or the TV tuner 5. Thus, the user can use a TV function by selecting a TV icon 57 through the signal selection button 13.

To enable the user to select a video signal source, the display apparatus 1 is configured in a following manner. As shown in FIG. 3, the display apparatus 1 includes a plurality of video signal input parts (not shown), a TV tuner sensor 29 to detect whether or not the TV tuner 5 is connected to the display apparatus 1, and a video decoder 25 to convert a video signal transmitted from the VTR 23 or the TV tuner 5 into a digital video signal. A video signal processing part 27 in the display apparatus processes the video signal outputted from the computer 21 or the video decoder 25. An OSD generator 33 is also provided in the display apparatus. A selection part 30 selects which of the video signals outputted from the computer 21, the VTR 23, and/or the TV tuner 5 will be displayed, and a micro controller 31 controls the video decoder 25 and the video signal processing part 27 so as to display a video signal outputted from a video signal source selected through the selection part 30 in a display part 35.

While the display apparatus 1 is turned on, the TV tuner sensor 29 detects whether or not the TV tuner 5 is connected to the display apparatus 1, and transmits a detected signal to the micro controller 31. The micro controller 31 stores a detected result based on the detected signal transmitted from the TV tuner sensor 29 in an internal memory (not shown). The micro controller 31 further controls the OSD generator 33 to display the signal selection OSD 50 containing the TV icon 57 when the selection part 30 is operated in a state where the TV tuner 5 is connected to the display apparatus 1. Thus, if the user selects the TV icon 57, the micro controller 31 controls the display part 35 to display a TV tuner control OSD 60. However, when the display part 30 is operated in a state that the TV tuner sensor 29 cannot detect the TV tuner 5, the micro controller 31 controls the signal selection OSD 50 so as to be displayed without the TV icon 57.

As shown in FIG. 2, the selection part 30, may include, for example, the signal selection button 13 and the OSD control button 15. Thus, the micro controller 31 controls the signal selection OSD 50 to be displayed when the signal selection button 13 is pushed. Further, the micro controller 31 controls the TV tuner control OSD 60 to be displayed when the OSD control button 15 is pushed in the state where the TV tuner 5 is connected to the display apparatus 1.

The TV tuner 5 is tuned in to a TV channel selected by the user, receives a TV signal of the selected TV channel, and demodulates the TV signal into a video signal and an audio signal. Herein, the micro controller 31 controls the TV tuner 5 to be tuned in to the selected TV channel when the user selects the TV channel with the OSD control button 15 through the TV tuner control OSD 60. The micro controller 31 controls the TV tuner 5 to receive the TV signal of the selected TV channel.

Figure 4:
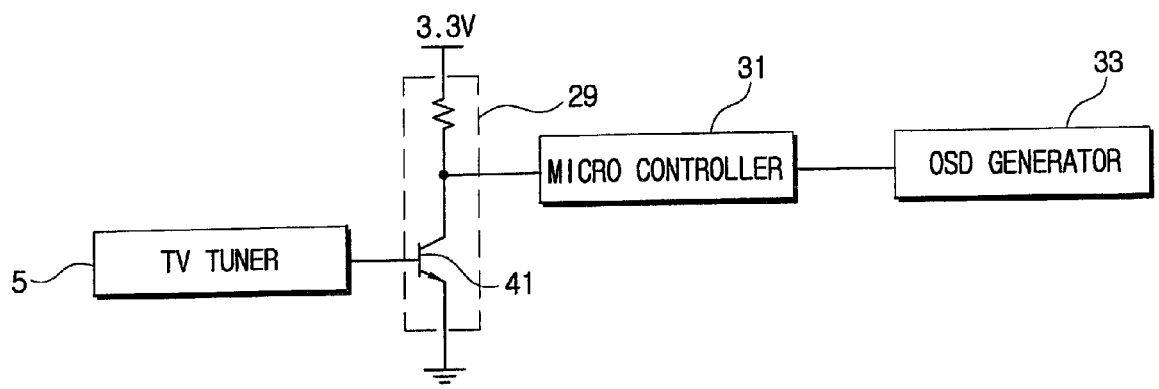
FIG. 4 is a circuit diagram of a TV tuner sensor of FIG. 3.

FIG. 4 is a circuit diagram of the TV tuner sensor 29 of FIG. 3. As shown in FIG. 4, the TV tuner sensor 29 may include an npn transistor 41, and a collector resistor connected to the npn transistor 41. Herein, the TV tuner 5 may be connected to the base of the npn transistor 41 through the TV tuner connecting port 4. The micro controller 31 may be connected between the collector of the npn transistor 41 and the collector resistor. When the TV tuner is connected to the base of the npn transistor 41, the npn transistor 41 is turned on, and the TV tuner sensor 29 outputs a low signal. In contrast, when the TV tuner is not connected to the base of the npn transistor 41, the npn transistor 41 is turned off, and the TV tuner sensor 29 outputs a high signal. Thus, the micro controller 31 determines whether the TV tuner 5 is connected to the display apparatus 1 or not, on the basis of the low signal or the high signal outputted from the TV tuner sensor 29.

Figure 5:
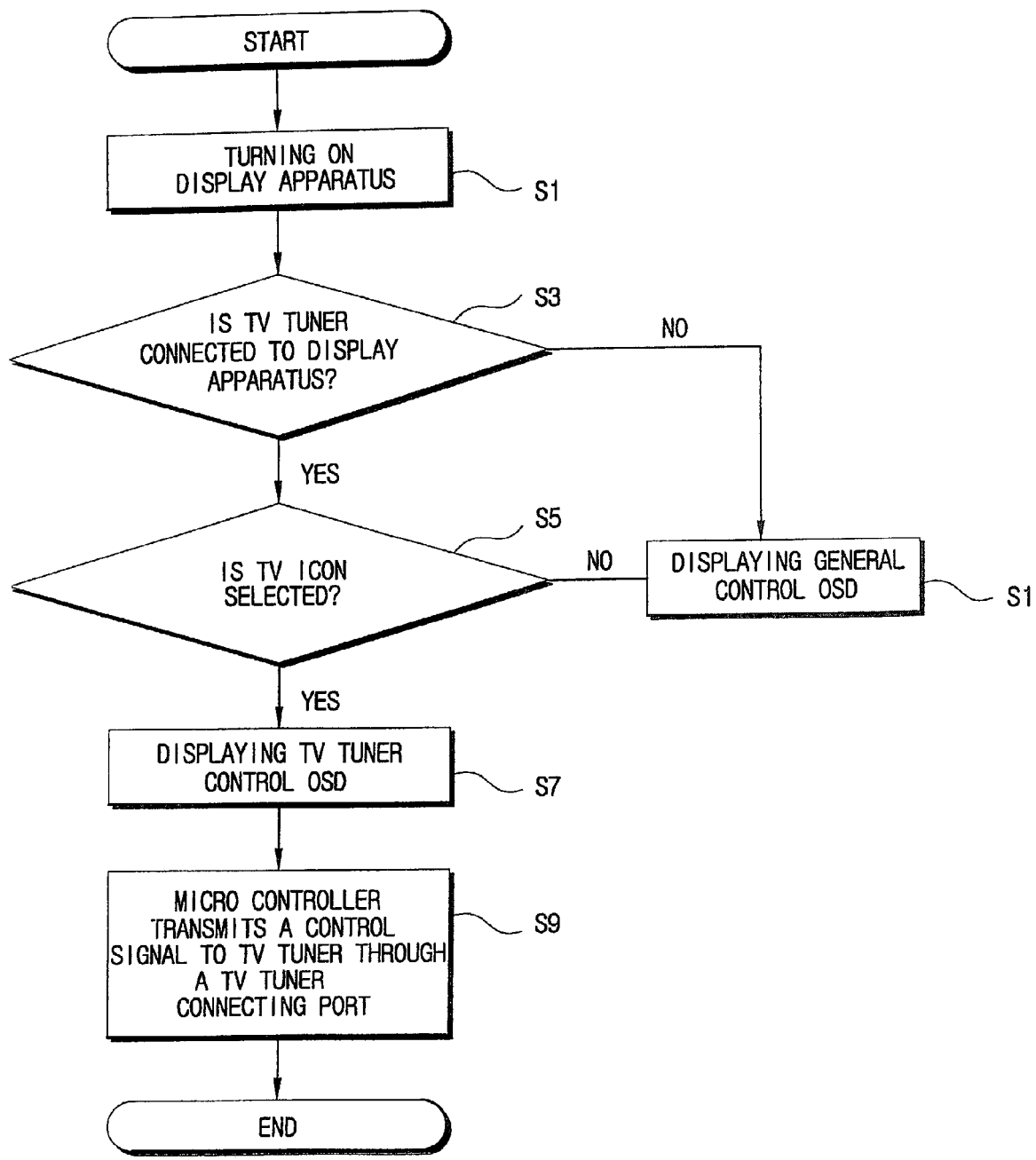
FIG. 5 is a control flow chart of the operation of the display apparatus according to the present invention.

FIG. 5 is a control flow chart of the display apparatus 1 according to the present invention. As shown in FIG. 5, at operation S1, the display apparatus 1 is turned on. At operation S3, a determination is made as to whether the TV tuner 5 is connected to the display apparatus 1 or not.

At operation S5, if the TV tuner 5 is connected to the display apparatus 1, that is, the signal selection button 13 is pushed in the state that the TV tuner 5 is connected to the display apparatus 1, the signal selection OSD 50 is displayed to select which of the video signals outputted from the computer 21, the VTR 23, and/or the TV tuner 5 will be displayed, thereby allowing a user to select the video signal. At operation S7, when the OSD control button 15 is pushed in the state that the TV icon is selected, the TV tuner control OSD 60 containing a plurality of TV channel icons is displayed. At operation S9, when the user changes the TV channel of the TV tuner 5 through the TV tuner control OSD 60, the micro controller 31 transmits a control signal to the TV tuner 5 through the TV tuner connecting port 4.

On the other hand, at operation S11, when the OSD control button 15 is pushed in the state that the TV tuner 5 is not connected to the display apparatus 1, a general OSD, which is employed in a conventional display apparatus so as to adjust brightness, sharpness, position, etc., of the display part 35 thereof, is displayed.

Figure 6:
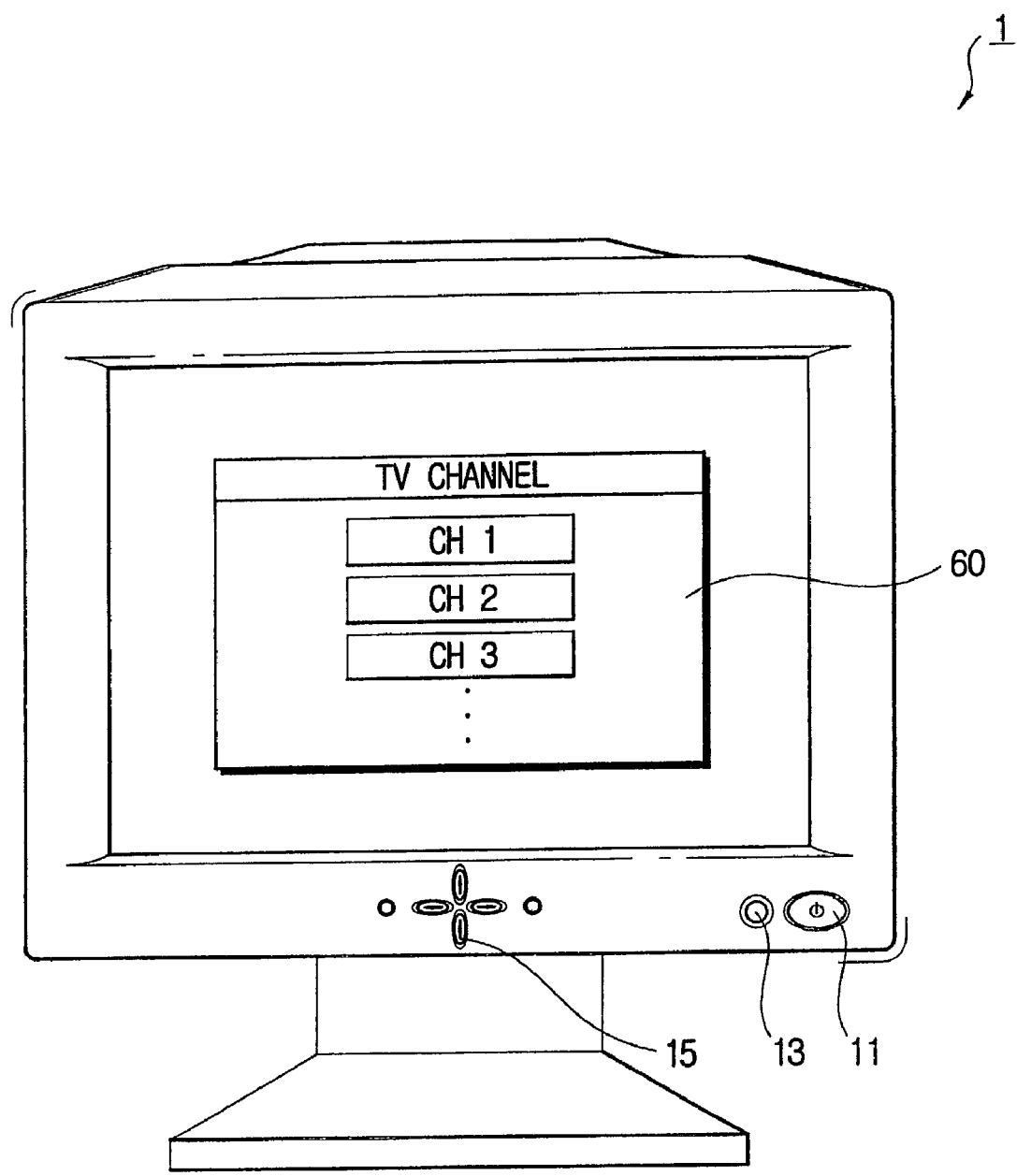
FIG. 6 illustrates a TV tuner control OSD.

FIG. 6 illustrates the TV tuner control OSD 60. As shown in FIG. 6, when the OSD control button 15 is pushed in the state that the TV tuner 5 is connected to the display apparatus 1, the TV tuner control OSD 60 containing the plurality of channel icons is displayed to allow the user to select the TV channel of the TV tuner 5.

In the display apparatus 1 according to the present invention, the OSDs to control the TV function are displayed in a following manner. When the user pushes the signal selection button 13, the signal selection OSD 50 (refer to FIG. 2) containing the TV icon 57 is displayed on the display part 35. Then, the user sets the display apparatus 1 for the TV function by pushing the signal selection button 13 repeatedly and by selecting the TV icon 57. After selecting the TV function, a desired TV channel is selected through the TV tuner control OSD 60 (refer to FIG. 6) displayed by the OSD control button 15.

In the above embodiment, when the TV tuner 5 is not connected to the display apparatus 1, the signal selection OSD 50 is displayed without containing the TV icon 57. However, in this case, an OSD indicating that the TV tuner 5 is not connected to the display apparatus 1 may be automatically displayed.

In the above embodiment, when the TV tuner is connected to the display apparatus 1, the TV tuner control OSD contains the plurality of TV channel icons. However, the TV tuner control OSD may further include icons of a sound mode (mono, stereo), icons involving a function for adding/deleting the channels, etc., besides the TV channel icons.

In the above embodiment, in order to display the signal selection OSD for selecting which of the video signals outputted from the computer 21, the VTR 23, and/or the TV tuner 5 will be displayed, a signal selection button is employed; in the alternative, a touch screen or a remote controller may be employed. In the above embodiment, in order to select the TV function, the signal selection OSD is employed; in the alternative, a multi-contact switch may be employed.

Accordingly, a connecting port for an external TV tuner is provided in a display apparatus, so that a TV function is selectively added at a user's option. A TV function is selected through an OSD, and the external TV tuner is controlled through the OSD, when it is connected to the display apparatus. Further, a reliability of the display apparatus is improved by preventing the TV tuner controlled through the OSD from being displayed when the TV tuner is not connected to the display apparatus.

As described above, the present invention provides the display apparatus to which the TV function is selectively added at the user's option. The present invention also provides a method of controlling the TV tuner through the OSD.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A display apparatus having a signal source connecting port through which a video signal source is connected, the display apparatus comprising:
   a TV tuner connecting port to connect to a TV tuner;
   a TV tuner sensor detecting whether the TV tuner is connected to the display apparatus through the TV tuner connecting port; and
   a micro controller displaying a signal selection OSD to permit a user to select from available video signal sources a TV signal transmitted from the TV tuner connecting port if the TV tuner sensor detects that the TV tuner is connected to the display apparatus.

2. A display apparatus having a signal source connecting port through which a video signal source is connected, the display apparatus comprising:
   a TV tuner connecting port to connect to a TV tuner;
   a TV tuner sensor detecting whether the TV tuner is connected to the display apparatus through the TV tuner connecting port;
   a micro controller displaying a signal selection OSD to select a TV signal transmitted from the TV tuner connecting port when the TV tuner sensor detects that th TV tuner is connected to the display apparatus; and
   a selection part to select one of a video signal, transmitted from the signal source connecting port, and the TV signal, transmitted from the TV tuner connecting port to be displayed, to control the TV tuner,
   wherein the micro controller displays the one of the video signal and the TV signal according to the selection from the selection part, to display a TV tuner control OSD when the TV signal is selected, and to transmit a control signal from the selection part to the TV tuner through the TV tuner connecting port based on the TV tuner control OSD.

3. The display apparatus as recited in claim 2, wherein the selection part comprises:
   an OSD control button displaying the TV tuner control OSD and controlling the TV tuner based on the TV tuner control OSD.

4. The display apparatus as recited in claim 3, wherein the micro controller displays the TV tuner control OSD when the OSD control button is pushed and the TV tuner is connected to the display apparatus.

5. The display apparatus as recited in claim 3, wherein the TV tuner control OSD comprises channel icons to select a channel of the TV tuner.

6. The display apparatus as recited in claim 1, further comprising:
at least one of a selection button and
a touch screen to select the TV tuner control OSD.

7. The display apparatus as recited in claim 1, wherein, when the TV tuner sensor does not detect the TV tuner, the micro controller displays an OSD indicating that the TV tuner is not connected to the display apparatus.

8. The display apparatus as recited in claim 1, wherein the TV tuner sensor comprises:
a transistor, wherein when the TV tuner is connected to the display apparatus, the transistor is turned on, outputting a first signal of a first state, and when the TV tuner is disconnected from the display apparatus, the transistor is turned off, outputting a second signal of a second state opposite to the first state, and
a resistor connected to the transistor.

9. A method of controlling a display apparatus comprising signal source connecting ports and a TV tuner connecting port to connect to a TV tuner, the method comprising:
detecting whether the TV tuner is connected to the display apparatus;
displaying a signal selection OSD when the TV tuner is detected;
selecting a TV signal through the signal selection OSD;
displaying a TV tuner control OSD when the TV signal is selected; and
transmitting a control signal to the TV tuner through the TV tuner connecting port in response to the selection of the TV signal.

10. The method as recited in claim 9, wherein the signal selection OSD comprises icons to select a video signal outputted from the TV tuner to be displayed on a video card of a computer and/or a VTR.

11. The method as recited in claim 9, wherein the TV tuner control OSD comprises channel icons to select a channel of the TV tuner.

12. The method as recited in claim 9, further comprising:
displaying an OSD indicating that the TV tuner is not connected to the display apparatus when the TV tuner is not detected.

13. The display apparatus as recited in claim 3, wherein the TV tuner control OSD further comprises icons of a sound mode and/or icons involving a function for adding/deleting a channel of the TV tuner.

14. The display apparatus as recited in claim 5, further comprising a remote controller selecting the TV tuner control OSD.

15. The display apparatus as recited in claim 5, further comprising a multi-contact switch selecting the TV tuner control OSD.

16. A display apparatus connectable to a VTR, a TV tuner, and a computer and comprising a signal source connecting port through which a video signal source is connected, the display apparatus comprising:
a TV tuner sensor detecting whether the TV tuner is connected to the display apparatus;
a video decoder converting a video signal transmitted from the VTR or the TV tuner into a digital video signal;
a video signal processing part processing a video signal from the computer and/or the digital video signal from the video decoder;
a selection part selecting the video signal from the computer and/or the digital video signal from the VTR or the TV tuner to be displayed and outputting a selected video signal indicative thereof;
a display part; and
a micro controller controlling the video decoder and the video signal processing part so as to display the selected video signal from the selection part in the display part.

17. A method of controlling a display apparatus comprising signal source connecting ports and a TV tuner connecting port to connect to a TV tuner, the method comprising:
detecting whether the TV tuner is connected to the display apparatus to prevent a signal selection OSD from being displayed when the TV tuner is not connected to the display apparatus;
displaying the signal selection OSD when the TV tuner is detected;
selecting a TV signal through the signal selection OSD;
displaying a TV tuner control OSD when the TV signal is selected; and
transmitting a control signal to the TV tuner through the TV tuner connecting port in response to the selection of the TV signal, allowing a user to selectively add a TV function through the connecting port for the TV tuner.

18. A method of controlling a display apparatus to display at least one video source and a TV signal, the display apparatus having at least one signal source connecting port to connect the one video source or the TV signal, the method comprising:
detecting whether a TV signal is received from the one signal source connecting port;
displaying a TV signal control OSD when a user OSD activator is activated while displaying the received TV signal and displaying a different video source signal control OSD when the user OSD activator is activated while displaying the one video source.

19. The method of claim 18, wherein the OSD includes at least one OSD sub-window including OSD control information for any of sound control, adding and/or deleting channels, brightness control, sharpness control, and/or position control.

20. The method of claim 18, further comprising determining whether a TV signal indicator, different from a video source indicator for the one video source, in a OSD, is selected by a user for display of the TV signal by the display apparatus.

21. The method of claim 20, wherein the OSD does not include the TV signal indicator when the TV signal is not detected as being received by the display apparatus.

22. A display apparatus, comprising:
a computer signal input port to which a computer signal is input;
a display part to selectively display at least one of a TV signal, from a TV tuner, and the computer signal;
an OSD generator to generate an OSD;
a user selection activator for activating a display of the OSD, the OSD permitting adjustments of a video signal for the display part;
a micro controller to control display of a TV signal control OSD, as the OSD, when the user selection activator is activated while the display part selectively displays the TV signal, and not displaying the TV signal control OSD while the display part is selectively displaying the computer signal.

23. The display apparatus of claim 22, wherein the micro controller does not display the TV signal control OSD when the TV signal is not detected as being input from the TV tuner.

24. The display apparatus of claim 23, wherein the OSD generator generates a signal selection OSD for selecting one of a plurality of video signals for display by the display part, with the micro controller controlling the OSD generator to generate different OSD sub-windows in the OSD corresponding to the selected the video signal.

25. The display apparatus of claim 24, wherein an OSD sub-window may include OSD control information for any of sound control, adding and/or deleting channels, brightness control, sharpness control, and/or position control.

26. The display apparatus of claim 22, further comprising:
a TV tuner connecting port to connect the TV tuner to the display apparatus,
wherein the micro controller controls the OSD generator to generate the TV signal control OSD and a displaying of the TV tuner control OSD on the displaying part only if the TV tuner is detected as being connected to the TV tuner connecting port.

27. The display apparatus of claim 22, wherein the micro controller controls the OSD generator to display selectable video sources for display by the display part, without an indicator representative of the TV tuner if the TV tuner is not detected as being connected to the TV tuner connecting port.

28. A method of controlling a display apparatus to display at least one of a video source and a TV signal, the display apparatus having at least one signal source connecting port to connect the one video signal source or the TV signal, the method comprising:
detecting whether a TV signal is received from the one signal source connecting port;
determining whether a user selection activator for display of an OSD is activated;
selectively displaying a TV signal control OSD when the user selection activator is activated while displaying the TV signal, and a video source signal control OSD when the user selection activator is activated while displaying the one video source.

29. The method of claim 28, wherein the OSD does not include the TV signal control OSD when the TV signal is not detected as being received by the display apparatus.

30. The method of claim 28, wherein the OSD includes at least one OSD sub-window including OSD control information for any of sound control, adding and/or deleting channels, brightness control, sharpness control, and/or position control.

31. A display apparatus having a signal source connecting port through which a video signal source is connected, the display apparatus comprising:
a TV tuner connecting port to connect to a TV tuner;
a OSD control button; and
a micro controller to, upon a selection of the OSD control button, selectively display a signal selection OSD to permit a user to select from a plurality of OSD icons an icon representing a selection of a TV signal transmitted from the TV tuner connecting port, when it is detected that the TV tuner is connected to the display apparatus, and a general OSD to control operations of the display apparatus other than to select from the plurality of OSD icons, when it is detected that the TV tuner is not connected to the display apparatus.

32. The display apparatus of claim 31, wherein the general OSD displays options for controlling one or more of a display brightness, display sharpness, and display position.

33. A display apparatus having a signal source connecting port through which a video signal source is connected, the display apparatus comprising:
a TV tuner connecting port to connect to a TV tuner;
a TV tuner sensor detecting whether the Tv tuner is connected to the display apparatus through the TV tuner connecting port; and
a micro controller to selectively display a signal selection OSD to permit a user to select from a plurality of OSD icons an icon for display apparatus, with the plurality of icons including an icon for selecting a TV signal transmitted from the TV tuner connecting port when it is detected that the TV tuner is connected to the display apparatus, and with the plurality of icons not including the icon for selecting the TV signal transmitted from the TV tuner connecting port when it is detected tha the TV tuner is not connected to the display apparatus.

* * * * *

UNITED STATES PATENT AND TRADEMARK OFFICE
CERTIFICATE OF CORRECTION

| | |
|---|---|
| PATENT NO. | : 7,298,424 B2 |
| APPLICATION NO. | : 10/140991 |
| DATED | : November 20, 2007 |
| INVENTOR(S) | : In-heung Oh |

Page 1 of 1

It is certified that error appears in the above-identified patent and that said Letters Patent is hereby corrected as shown below:

Column 6, Line 44, change "th" to --the--.

Column 9, Line 4, after "selected" delete "the".

Column 9, Line 31, after "OSD" insert --,--.

Column 9, Line 33, after "OSD" insert --,--.

Column 10, Line 26, change "Tv" to --TV--.

Column 10, Line 31, after "display" insert --on the display--.

Column 10, Line 37, change "tha" to --that--.

Signed and Sealed this

Sixth Day of May, 2008

JON W. DUDAS
*Director of the United States Patent and Trademark Office*

UNITED STATES PATENT AND TRADEMARK OFFICE
CERTIFICATE OF CORRECTION

PATENT NO. : 7,298,424 B2
APPLICATION NO. : 10/140991
DATED : November 20, 2007
INVENTOR(S) : In-heung Oh It is certified that error appears in the above-identified patent and that said Letters Patent is hereby corrected as shown below:

Column 6, Line 44, change "th" to --the--.

Column 9, Line 4, after "selected" delete "the".

Column 9, Line 31, after "OSD" insert --,--.

Column 9, Line 33, after "OSD" insert --,--.

Column 10, Line 26, change "Tv" to --TV--.

Column 10, Line 31, after "display" insert --on the display--.

Column 10, Line 37, change "tha" to --that--.

Signed and Sealed this

Twentieth Day of May, 2008

JON W. DUDAS
*Director of the United States Patent and Trademark Office*